June 22, 1926.

P. FELIX

FISHING TACKLE

Filed March 24, 1925

1,589,522

Inventor
Paul Felix
by his Attorneys

Patented June 22, 1926.

1,589,522

UNITED STATES PATENT OFFICE.

PAUL FELIX, OF LITTLE FALLS, MINNESOTA.

FISHING TACKLE.

Application filed March 24, 1925. Serial No. 17,932.

It is frequently desirable, in angling for certain kinds of fish, to have the hook and bait close to the bottom of the water, but if the tackle is weighted so as to bring the hook to the bottom it will commonly lie directly upon the bed of the stream and become entangled in any growing plants or débris which may cover the bottom.

An object of my invention is to provide a fishing tackle in which the hook may be supported adjacent the bottom without coming into contact therewith.

A further object is to provide means whereby the hook and bait will float freely in the water and will be given a spinning or turning motion either by the movement of the tackle through the water or by the current of the water itself.

A still further object of the invention is the provision of a float of peculiar shape which will give the desired spinning or turning movement to the hook upon any relative movement between the float and the water.

Other objects of the invention will be apparent from the following detailed description and the appended claim.

In the drawings:—

Figure 1:
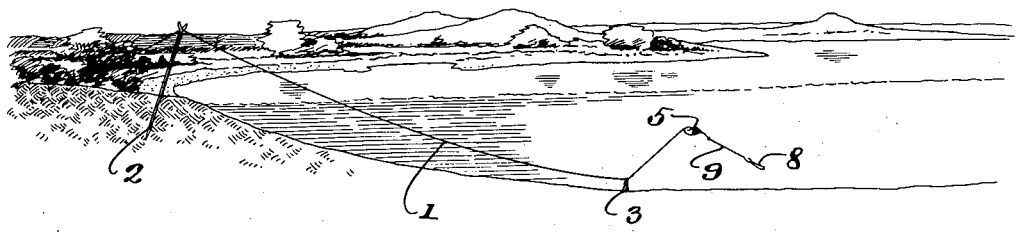
Figure 1 is a perspective view of a tackle in operative position.
Figure 2:
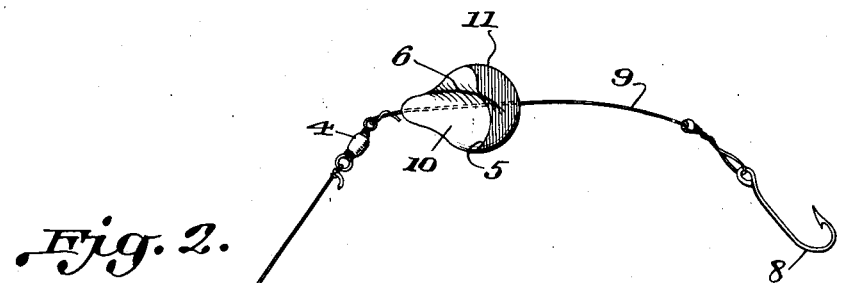
Figure 2 is an enlarged side view of the weight, float and hook, showing the structural relation of these parts to each other.
Figure 3:
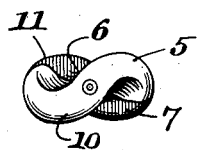
Figure 3 is an end view of the float.
Figure 4:
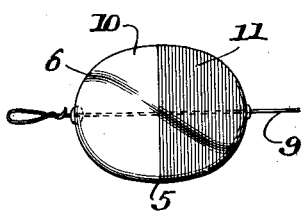
Figure 4 is a side view of the float.

My improved tackle comprises the usual line 1 which may be attached to a rod comprising a reel in the usual manner, or may be supported by a pole 2 driven into the bank of the river. The device may be used by an angler on shore or in a boat.

Attached to the line 1 at the desired point is a weight 3 which is heavy enough to overcome the buoyant force of the float and line so that the weight will rest normally on the bottom or bed of the body of water in which the tackle is being used. This weight is attached to the line in any desired manner in order that it can be adjusted to different positions.

The end of the line is attached by a single or double swivel bearing 4 to a float proper 5. This float or buoy is of peculiar shape.

The end view closely resembles a portion of an auger since it is distorted from an oval shape by a generally spiral groove having a lengthwise direction. These grooves 6 and 7 give the float somewhat the form and function of a small propeller. The result of this is that any relative motion between the float and the water will produce a turning motion of the float no matter whether the float is being moved through the water or a current of water is passing the float.

The hook 8 is carried at the end of a fine flexible wire 9 which is attached to the float 5. Any particular method of attaching these parts may be employed as desired, but in the embodiment of the invention illustrated the wire 9 passes through the float and is connected directly to one eye of the swivel 4.

In using the device the weight 3 will be attached to the line 1 at a distance from the float 5 which is appreciably greater than the distance of the hook from the float. The weight will also be heavy enough to overcome the tendency of the float to remain on the surface of the water. The parts will therefore take the position illustrated in Figure 1 wherein the weight rests upon the bottom of the stream while the float rests as high as possible thereabove. This will be sufficient to keep the hook 8 clear of the bed of the stream at all times.

The float and hook can turn easily at all times relative to the line because of the swivel joint 4. Any relative movement between the float and the water caused either by drawing the line through the water or by the current of the water will produce a whirling or turning movement of the float and hook relative to the water but without twisting the line in any manner.

It is preferable to form the float of two or more colors in order to render the same more attractive. As illustrated, one portion, 10, is white while the other portion, 11, is red. Any suitable colors may be selected, however, and in some cases it may be found desirable to employ colors which will harmonize with the water or the vegetable life therein in order that the float may blend with its surroundings.

It is obvious that the float and weight may be made of any desired size dependent upon the size of the hook or weight of the tackle employed. It is also obvious that minor variations may be made in the construction of the device without departing in any manner from the spirit of the invention which is to be regarded as limited only by the scope of the appended claim.

I claim as my invention:

A fishing tackle comprising a line, a weight carried thereby, a wire attached to the end of the line by a swivel connection, a float and hook supported thereby, the float being generally in the form of a flattened oval with spiral grooves, so that relative movement between the float and surrounding water will cause a turning movement of the float about its axis.

In testimony whereof, I have hereunto subscribed my name.

PAUL FELIX.